US010195639B2

(12) United States Patent
Johnson et al.

(10) Patent No.: US 10,195,639 B2
(45) Date of Patent: Feb. 5, 2019

(54) MODULAR SPRAY ROLLER SYSTEM

(71) Applicant: GRACO MINNESOTA INC., Minneapolis, MN (US)

(72) Inventors: Daniel R. Johnson, Champlin, MN (US); Dale C. Pemberton, Big Lake, MN (US); David J. Thompson, Oak Grove, MN (US); Dale D. Johnson, Shoreview, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 221 days.

(21) Appl. No.: 15/108,441

(22) PCT Filed: Jan. 5, 2015

(86) PCT No.: PCT/US2015/010113
§ 371 (c)(1),
(2) Date: Jun. 27, 2016

(87) PCT Pub. No.: WO2015/103519
PCT Pub. Date: Jul. 9, 2015

(65) Prior Publication Data

US 2016/0325306 A1 Nov. 10, 2016

Related U.S. Application Data

(60) Provisional application No. 61/923,276, filed on Jan. 3, 2014.

(51) Int. Cl.
*B43M 11/02* (2006.01)
*B05C 17/035* (2006.01)
(Continued)

(52) U.S. Cl.
CPC ........ *B05C 17/035* (2013.01); *B05C 17/0205* (2013.01); *B05C 17/0222* (2013.01); *B05C 17/0341* (2013.01); *B05C 17/0217* (2013.01)

(58) Field of Classification Search
CPC . B05C 17/022; B05C 17/035; B05C 17/0341; B05C 17/0222; B05C 17/0205
See application file for complete search history.

(56) References Cited

U.S. PATENT DOCUMENTS 3,331,093 A 7/1967 Mayden
4,059,358 A * 11/1977 Arai ........................ B05B 1/267 401/219

(Continued)

FOREIGN PATENT DOCUMENTS

CN 1750888 A 3/2006
CN 100429004 C 10/2008
KR 1020110102772 A 9/2011

OTHER PUBLICATIONS

International Search Report and Written Opinion for PCT Application No. PCT/US2015/010113, dated Apr. 24, 2015, 12 pages.

(Continued)

*Primary Examiner* — Jennifer C Chiang
(74) *Attorney, Agent, or Firm* — Kinney & Lange, P.A.

(57) ABSTRACT

A spray roller system for application of architectural paints coating, includes an extension tube, a spray head mounted on a distal end of the extension tube, and the in-line valve with a trigger mounted on a proximal end of the extension tube, and a roller handle removable mounted on the extension tube adjacent the spray head. The spray roller system can spray and back roll a coating on a down stroke and roll on each up stroke. When the roller handle is removed from the extension tube, it can be used to hand roll sensitive wall areas. With the roller handle removed, extension tube, spray head, and in-line valve can be used as a spray extension to apply coatings in hard to reach areas.

30 Claims, 5 Drawing Sheets

(51) Int. Cl.
*B05C 17/02* (2006.01)
*B05C 17/03* (2006.01)

(56) References Cited

U.S. PATENT DOCUMENTS

| | | | | |
|---|---|---|---|---|
| 4,140,410 | A | 2/1979 | Garcia | |
| 4,217,059 | A | 8/1980 | Shelton | |
| 4,537,522 | A | 8/1985 | Charney et al. | |
| 4,551,037 | A | 11/1985 | Kille et al. | |
| 5,271,683 | A | 12/1993 | Snetting et al. | |
| 5,595,451 | A * | 1/1997 | Harrison, Jr. | B05B 15/654 401/219 |
| 5,685,658 | A | 11/1997 | Woodruff | |
| 5,853,258 | A | 12/1998 | Woodruff | |
| 6,739,017 | B1 * | 5/2004 | Johnson | B05C 17/0222 15/230.11 |
| 7,455,469 | B1 | 11/2008 | Langdon | |
| 8,821,058 | B2 * | 9/2014 | Walker | B05B 15/063 401/219 |
| 9,127,703 | B2 * | 9/2015 | Lambertson, Jr. | F16B 7/1409 |
| 2005/0226680 | A1 | 10/2005 | Nguyen | |
| 2007/0122227 | A1 | 5/2007 | Varnum | |
| 2008/0247808 | A1 | 10/2008 | Costigan | |

OTHER PUBLICATIONS

Taiwan Office Action for Taiwan Patent Application No. 104100083, dated Feb. 12, 2018, 10 pages.
Second Chinese Office Action for Chinese Patent Application No. 2015800033879, dated Jan. 8, 2018, 12 pages.
International Preliminary Report on Patentability for PCT Application No. PCT/US2015/010113, dated Jul. 5, 2016, 9 pages.
Extended European Search Report for European Patent Application No. 15733205.7, dated Sep. 11, 2017, 7 pages.
Chinese Office Action for Chinese Patent Application No. 2015800033879, dated May 25, 2017, 14 pages.

* cited by examiner

MODULAR SPRAY ROLLER SYSTEM

REFERENCE TO RELATED APPLICATIONS

This application claims the benefit of U.S. Provisional Application Ser. No. 61/923,276 filed Jan. 3, 2014, which is incorporated by reference in its entirety.

BACKGROUND

Application of architectural paints and coatings can require a combination of spray application and back rolling, particularly when the coating is being applied to rough or porous surfaces. Typically, the coating is first applied using a spray applicator, such as an airless paint spray head. A paint roller, often attached to an extension handle, is then rolled over the applied paint to stipple or back roll the applied coating. This involves multiple tools and multiple operations to apply the coating and obtain the desired finish.

Spray rollers have existed in the professional finishing market (existing rollers have deficiencies in the areas of user convenience or required tools), finish quality, and nuisance issues (leaking or dripping during operation). Existing spray rollers are typically targeted for rough surface finishing applications such as stucco or other cement based surfaces and are generally viewed as unsuitable for color coat applications (final finish surface) on interior dry wall due to finish quality and over spray concerns.

SUMMARY

A spray roller system includes an extension tube, a spray head mounted on the distal end of the extension tube, in-line valve mounted on a proximal end of the extension tube, and a roller handle removably mounted on the extension tube adjacent the spray head. The roller handle includes a handle configured to be clamped on the extension tube adjacent the spray head and a support structure extending from the handle to position a paint roller forward of the spray head. The system provides three tools in one: a spray roller capable of simultaneously spray application of coating on a surface and back rolling the just applied coating; a roller handle (when removed from the extension tube) for hand rolling to apply a coating, and a spray extension for spray application of the coating to hard to reach areas.

DETAILED DESCRIPTION

Figure 1:
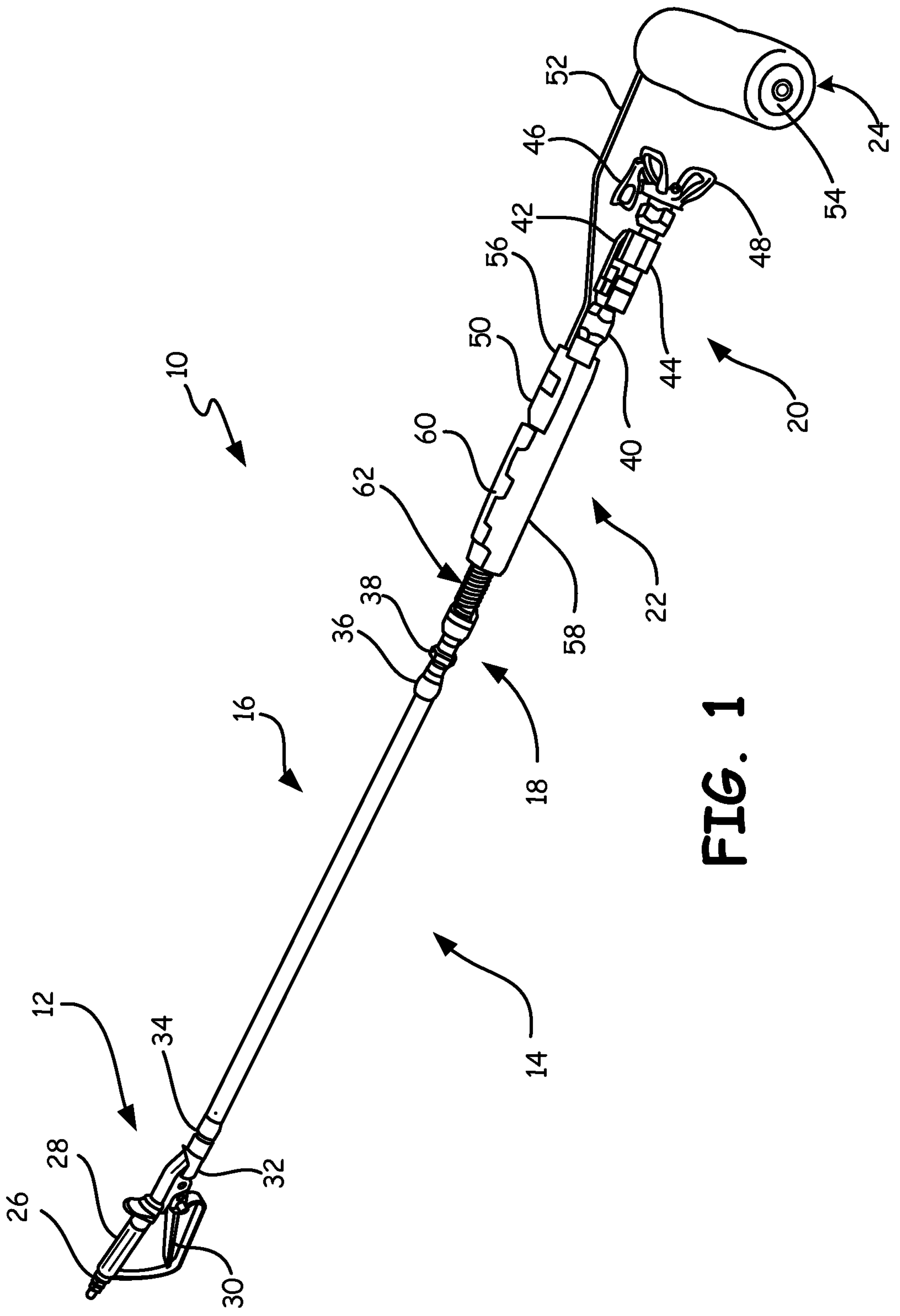
FIG. 1 is a perspective view of a spray roller system.

FIG. 1 shows spray roller system 10 which is a modular multifunctional system with the ability to perform spray rolling, spray extension, and hand rolling applications of architectural paint and coatings. As shown in FIG. 1, system

10 is configured to perform spray rolling, in which coating is sprayed on to a surface, and back rolled in a single operation.

Spray roller system 10 includes in-line valve 12, extension tube 14 (which includes extension tube sections 16 and 18), spray head 20, roller handle 22, and roller cover 24. In-line valve 12 includes pressurized paint inlet 26, handle 28, trigger 30, and outlet 32. In-line valve 12 is connected at outlet 32 to fitting 34 at the proximal end of extension tube section 16. In one embodiment, in-line valve 12 is a Graco contractor in-line valve, part number 244161.

Coupling 36 of extension tube section 16 is connected to coupling 38 of extension tube section 18. Spray head 20 is connected to coupling 40 at the distal end of second extension tube section 18.

Spray head 20 includes swivel coupling 42, spray valve 44, spray tip 46, and spray guard 48. Swivel coupling 42 connects coupling 40 of extension tube section 18 to spray valve 44. The connection of swivel coupling 42 to spray valve 44 allows pivoting of valve 44 in order to align the spray properly with the position of roller cover 24. In one embodiment, spray valve 44 is a Graco CleanShot valve, part number 287030. Spray tip 46 defines the spray pattern of the coating that is being sprayed. Guard 48 is positioned forward of spray tip 46.

Roller handle 22 includes handle 50, arm 52, and frame 54. Handle 50 is clamped onto extension tube section 18 so that it can either rotate with respect to extension tube section 18 or move axially on extension tube section 18. Handle 50 includes sleeve 56, door 58, and latch 60. When latch 60 is released and door 58 is opened, sleeve 56 can slide laterally off of extension tube section 18. With door 58 and latch 60 in the closed position, handle 50 is clamped in place on extension tube section 18.

Arm 52 extends forward from sleeve 56 of handle 50 and provides a structure to position a paint roller (formed by frame 54 and roller cover 24) forward of valve 44 and spray tip 46. The distance between spray tip 46 and roller cover 24 can be adjusted by releasing latch 60 and opening door 58, repositioning sleeve 56 axially on second extension tube section 18, and then closing door 58 and latch 60 to again clamp handle 50 on second extension tube section 18. The ability to adjust the relative position of roller cover 24 with respect to spray tip 46 allows the user to adjust the position of roller cover 24 so that it covers the full width of the spray fan pattern being produced by spray tip 46. The ability to pivot spray valve 44 allows the user to adjust the position of valve 44 so that the spray fan produced by spray tip 46 is aimed to hit below roller cover 24 as roller cover 24 is rolled down a wall. This allows the paint to be sprayed on the wall and immediately back rolled in a single operation.

Figure 2:
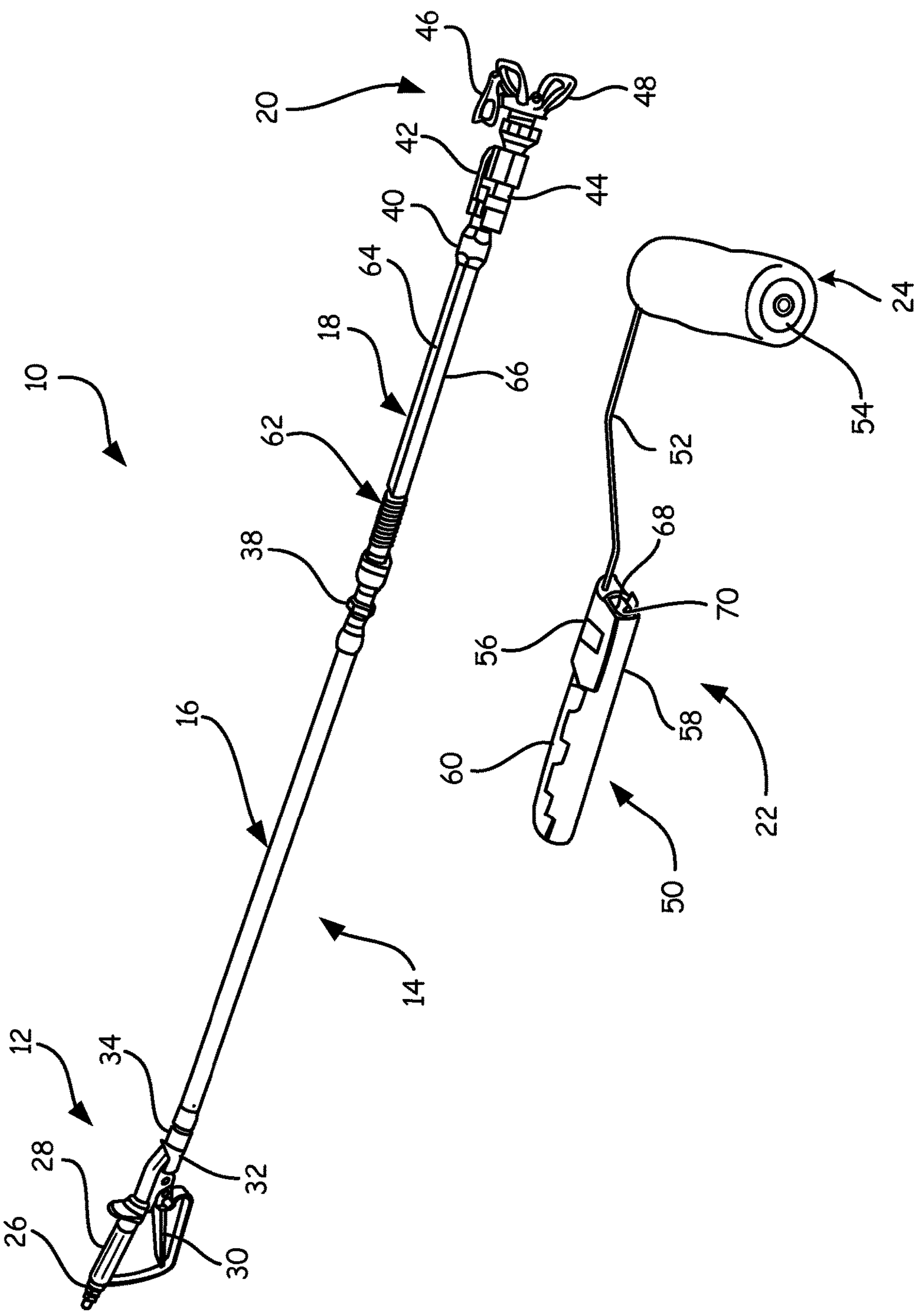
FIG. 2 is a perspective view of the spray roller system of FIG. 1, with the roller handle and the spray extension separated.

FIG. 2 shows system 10 with roller handle 22 removed from second extension tube section 18. With this separation of parts, roller handle 22 and roller cover 24 can be used for hand rolling paint on sensitive wall areas such as outside corners and adjacent walls. The user does not have to make use of another separate paint roller to perform these hand rolling operations. Roller cover 24 will already have on it the paint that is being applied to the wall, and it will not be necessary to clean an additional paint roller after the painting is completed.

With roller handle 22 removed, valve 12, extension tube 14, and valve 20 form a spray extension that can be used separately to spray hard-to-reach areas that cannot be painted when roller handle 22 is attached. As illustrated in FIGS. 1 and 2, system 10 provides three tools in one; a spray roller for applying and back rolling coatings in a single operation, a roller handle for hand rolling, and a spray extension.

As shown in FIG. 2, second extension tube section 18 includes a plurality of circumferential ribs and also a pair of longitudly extending top and bottom flat surfaces 64 and 66. Ribs 62 mate with corresponding ribs 74 on an interior surface of sleeve 56 (shown in FIG. 4) to lock handle 50 in place so that it cannot move axially on tube extension 18 during use. The series of ribs 62 allow the relative longitudinal position of handle 50 to be adjusted.

Flat top and bottom surfaces 64 and 66 on extension tube section 18 mate with flat interior surfaces 68 and 70 of sleeve 56. This prevents rotation of sleeve 56 and roller handle 22 about the longitudinal axis of tube section 18.

In FIG. 2, the relative positions of swivel 42 and spray valve 44 have been reversed compared to their positions shown in FIG. 1. This illustrates that spray valve 44 can be mounted on either side of swivel 42.

Figure 3:
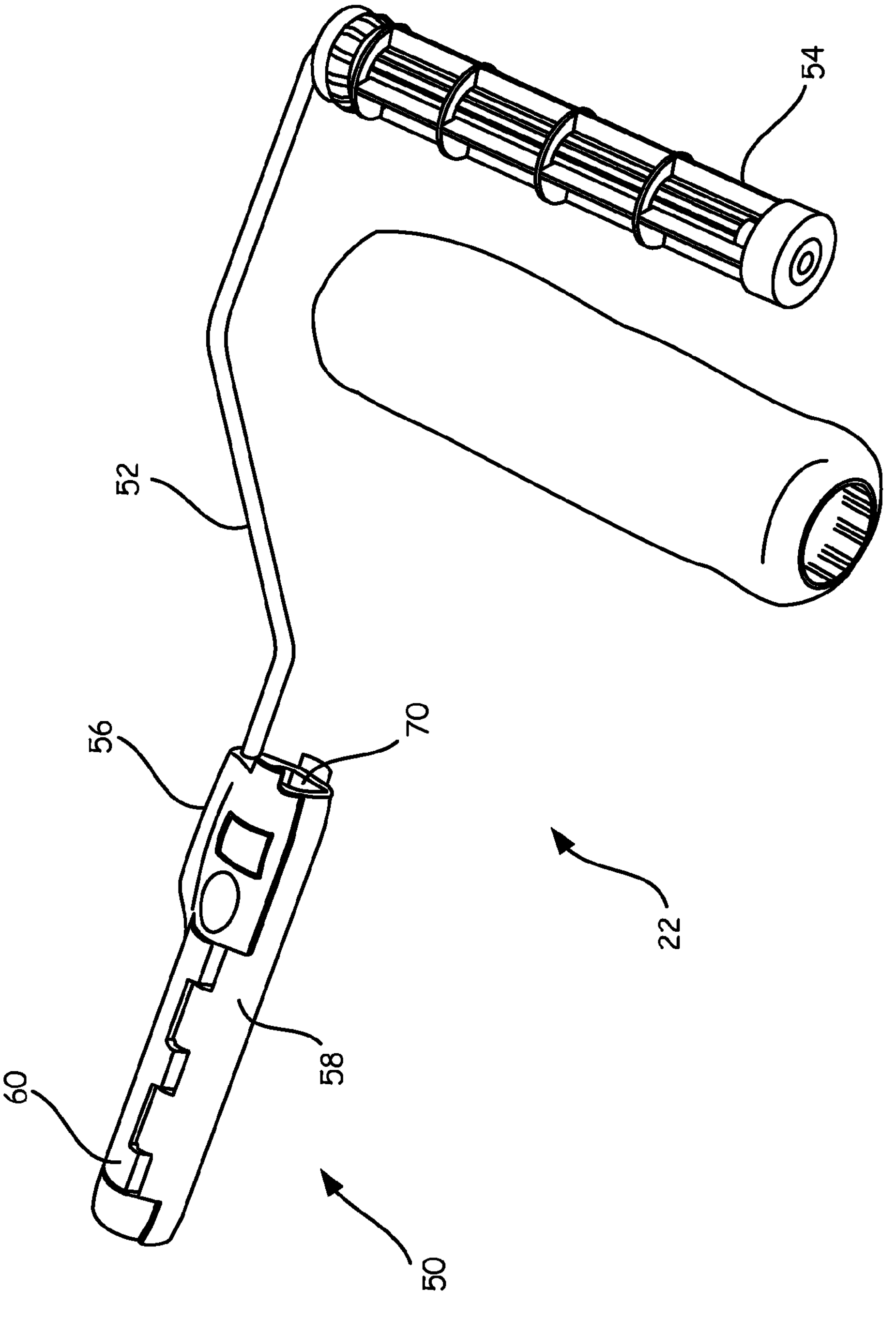
FIG. 3 is a perspective view of the roller handle of FIGS. 1 and 2, with the roller cover separated from the roller handle.

FIG. 3 shows roller handle 22 and roller cover 24 separated. In FIG. 3, frame 54 can be seen. Frame 54 is rotatably mounted on one end of arm 52, and roller cover 24 slides onto frame 54.

Figure 4:
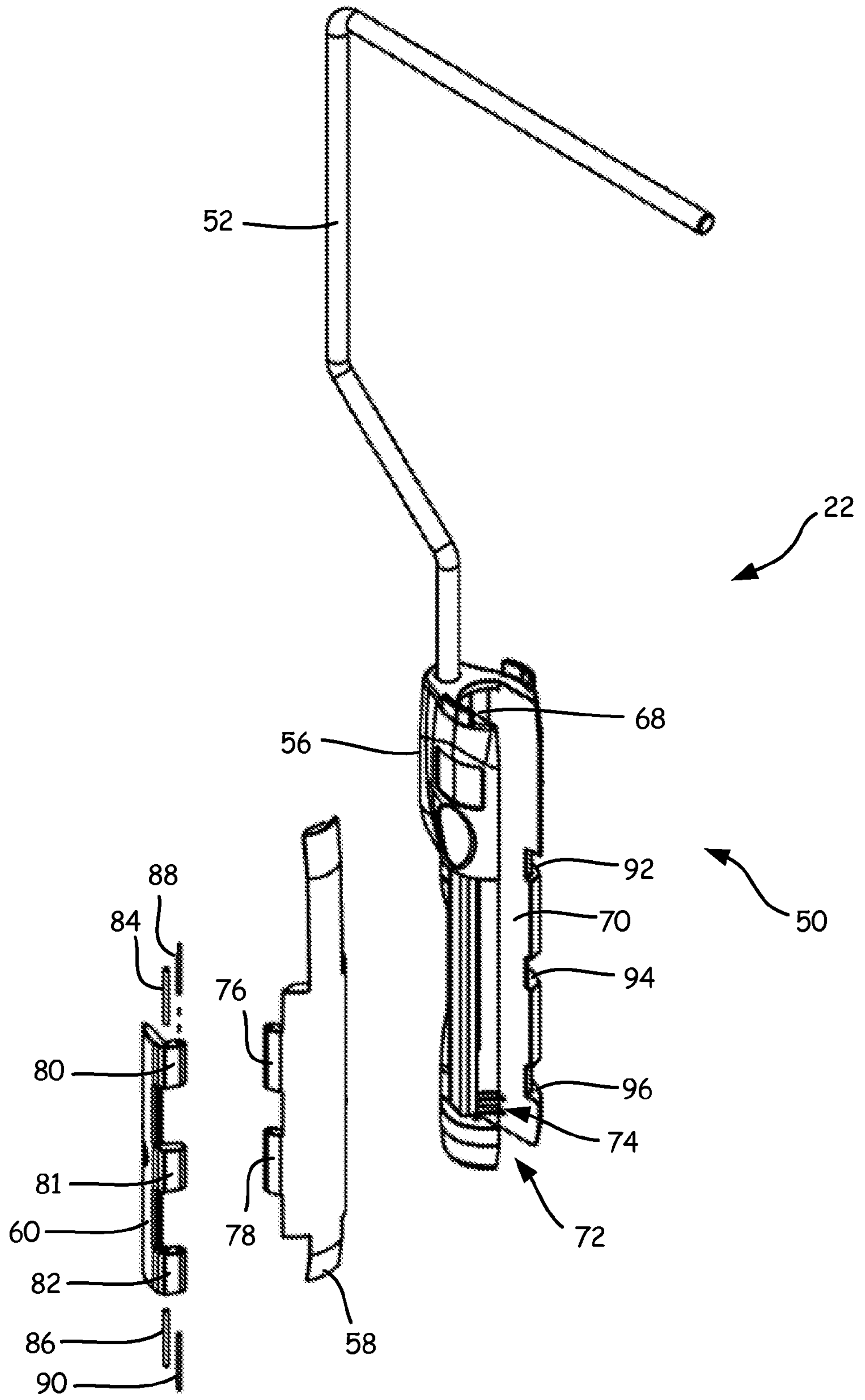
FIG. 4 is an exploded view of the roller handle.

FIG. 4 shows an exploded view of roller handle 22. In particular, handle 50 has been exploded to show interior channel 72 which extends longitudinally and opens along a side of sleeve 56. In FIG. 4, flat surfaces 68 and 70 of interior channel 72 can be seen. In addition, ribs 74 on an inner surface of channel 72 can be seen. Ribs 74 mate with ribs 62 of tube extension 18 shown in FIG. 2. There are fewer ribs 74 than ribs 62, so that ribs 74 can mate with ribs 62 in a number of different positions along extension tube section 18.

In FIG. 4, door 58 and latch 60 are also shown separate from sleeve 56. Door 58 includes tabs 76 and 78, and latch 60 includes tabs 80, 81, and 82. Tab 76 of door 58 is positioned between tabs 80 and 81 of latch 60. Tab 78 of door 58 is positioned between tabs 81 and 82 of latch 60. Pivot pin 88 pivotally connects tab 76 of door 58 to tab 80 of latch 60. Pivot pin 90 pivotally connects tab 78 of door 58 to tab 82 of latch 60. Pivot pins 84 and 86 pivotally connect latch 60 to frame 56. In particular, pivot pin 84 pivotally connects tab 80 of latch 60 to sleeve 56, and pivot pin 86 pivotally connects tab 82 of latch 60 to sleeve 56.

Sleeve 56 includes notches 92, 94, and 96, which receive three mating tabs of door 58 (which are not shown in FIG. 4). The three mating tabs are located along the side edge of door 58 which is opposite the side edge having tabs 76 and 78. When the three mating tabs fit within notches 92, 94, 96 and door 58 is moved to a closed position covering the side opening of channel 72, latch 60 can then be closed. Pivotal movement of latch 60 about pivot pins 84 and 86 applies a closing force to tabs 76 and 78 of door 58 through pivot pins 88 and 90. Once closed and latched, door 58 cannot be opened without first releasing latch 60.

Figure 5:
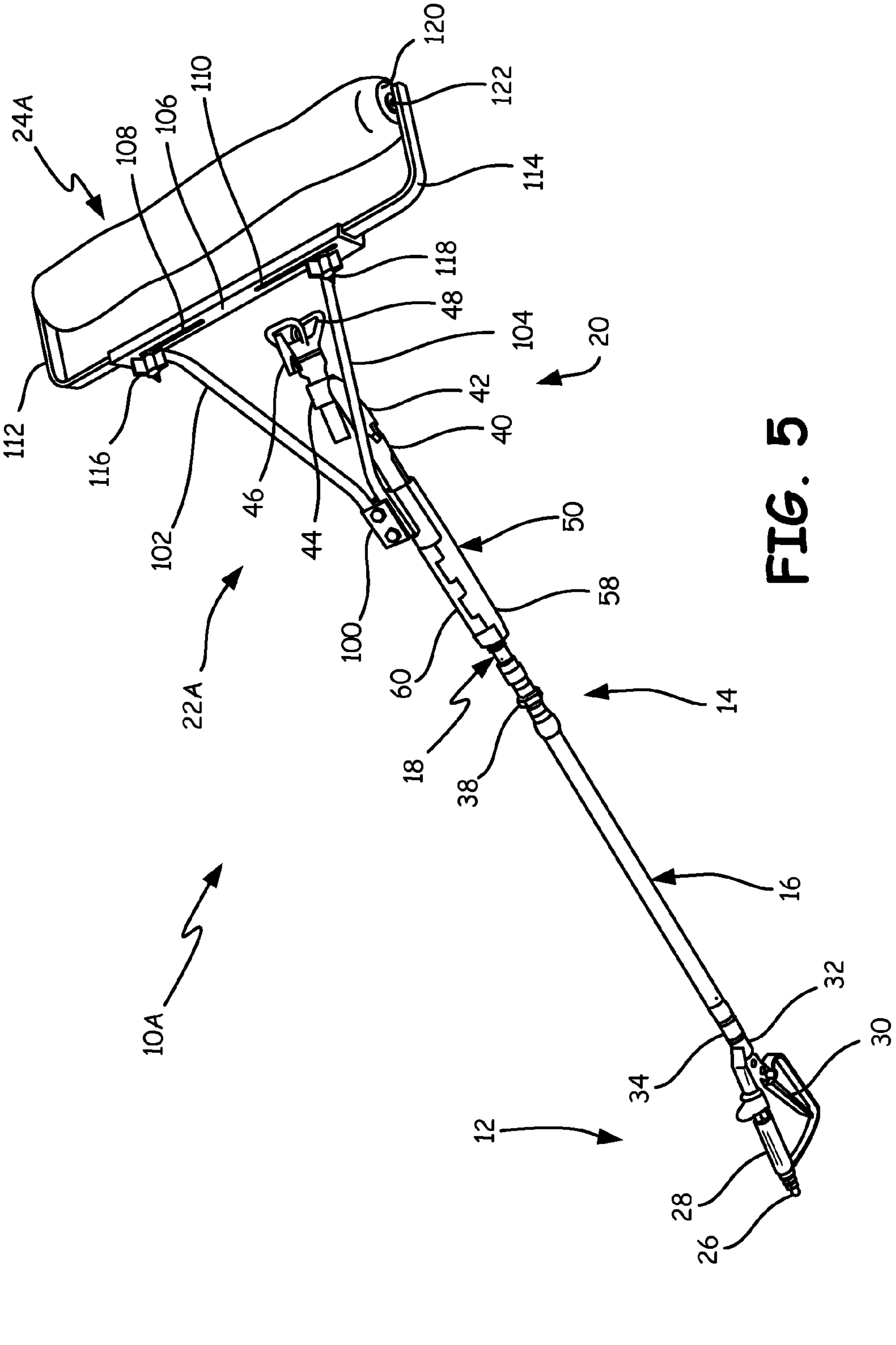
FIG. 5 is a perspective view of another embodiment of the spray roller system for use with wider paint roller covers.

FIG. 5 shows spray roller system 10A, which is similar to spray roller system 10, except that it includes roller handle 22A that accommodates paint roller cover 24A, which is of greater width than paint roller cover 24. System 10A uses many of the same components shown in FIGS. 1 and 2, and similar reference numbers are used to designate those similar elements. In particular, in-line valve 12, extension tube 14 (formed by extension tubes sections 16 and 18) and spray head 20 shown in system 10A of FIG. 5 are the same as shown in FIGS. 1 and 2.

The difference in system 10A of FIG. 5 is roller handle 22A, which handles larger roller cover 24A shown in FIG. 5A, and other rollers of varying width. Roller handle 22A includes handle 50, bracket 100, arms 102 and 104, track (or channel) 106 with slots 108 and 110, L-shaped arms 12 and 114, set screws 116 and 118, end caps 120, and pins 122.

Bracket 100 attaches arms 102 and 104 to handle 50. At their outer ends, arms 102 and 104 are connected to channel 106. Arms 112 and 114 slide within track 106 in order to accommodate roller covers of varying width. Set screws 116 and 118 hold arms 112 and 114 in position during use. When roller cover 24A is to be removed, set screws 116 and 118 can be loosened to allow arms 112 and 114 to be moved outward. End caps 120 fit into opposite ends of roller cover 24A. Pins 122 project inward from the outer ends of arms 112 and 114 into end caps 120 to provide a rotational axis for roller cover 24A.

As with system 10, system 10A provides three tools in one. When roller handle 22A is removed from extension tube 18A, roller handle 22A can be used as a hand roller. The remaining components can then be used as a spray extension.

The spray roller system disclosed is a modular design that allows quick conversion for spray rolling, spray extension and hand rolling without the use of tools for assembly or disassembly. This is accomplished through the use of a lightweight, removable roller handle to allow convenient rolling of areas sensitive to overspray concerns.

The system also allows user adjustment for optimal match of spray fan width to roller cover width for maximum efficiency and optimal finish quality in use. This adjustment is necessary due to variability of spray material properties, application temperatures, spray tip construction and spray tip wear over useful life. This adjustment also allows for the minimization of overspray. The adjustment is simple and requires no tools. The longitudinal position of roller handle 22, 22A is changed by unclamping the roller handle, moving it along tube extension section 18, and reclamping roller handle 22, 22A at the new position. This design allows user adjustment for optimal match of spray fan width to roller cover width for maximum efficiency and optimal finish quality in use.

The modular system includes an automatic spray valve that eliminates dripping when the tip is lowered past horizontal in use and minimizes imperfections due to "spitting" while spraying. The assembly preferably includes Graco's CleanShot™ valve.

The system may be used to make modular spray roller assemblies in all industry standard roller cover widths (e.g. 3 inch, 9 inch, 12 inch, 18 inch, European sizes of 18 cm, 25 cm, etc.) or adjustable versions capable of using multiple roller cover widths.

The "no assembly tools" modular design is accomplished through the use of a lightweight removable roller handle to allow convenient rolling of areas sensitive to overspray concerns. Removable roller handle 22, 22A can be accomplished through the use of manually operated latch 60 and door 58, which allows reliable attachment to extension tube section 18. When removed from extension tube section 18, the roller handle 22, 22A becomes a stand-alone manual paint roller.

The modular system is compatible with industry standard connections and is multifunctional with the ability to perform spray rolling, spray extension and hand rolling applications.

An easily removed roller handle 22, 22A allows for convenient hand rolling of areas sensitive to overspray concerns. The hand roller is already wetted in color after being used for spray rolling applications, thereby eliminating need for use of a secondary hand roller that requires procurement and cleaning.

Although the present invention has been described with reference to preferred embodiments, workers skilled in the art will recognize that changes may be made in form and detail without departing from the spirit and scope of the invention.

The invention claimed is:

1. A spray roller system comprising:

an extension tube having a distal end and a proximal end;

a spray head mounted on the distal end of the extension tube;

an in-line valve mounted on the proximal end of the extension tube; and a roller handle removably mounted on the extension tube adjacent to the spray head, the roller handle including a handle configured to clamp onto a portion of the extension tube located rearward of the distal end of the extension tube and the spray head, and a support structure extending from the handle beyond the spray head and the distal end of the extension tube to position a paint roller forward of the spray head.

2. The spray roller system of claim 1, wherein the handle includes a shell having a longitudinal interior channel with a side opening that allows the shell to slide laterally on to and off of the extension tube.

3. The spray roller system of claim 2, wherein the extension tube has exterior surfaces that mate with interior surfaces of the interior channel of the shell to prevent rotation of the handle when the handle is clamped on the extension tube.

4. The spray roller system of claim 3, wherein the exterior surfaces of the extension tube include a flat top surface and a flat bottom surface.

5. The spray roller system of claim 2, wherein the extension tube includes a plurality of exterior circumferential ribs, and wherein the interior channel of the shell has a feature that engages at least some of the exterior circumferential ribs of the extension tube to define a longitudinal location of the handle on the extension tube and to prevent longitudinal movement of the handle on the extension tube.

6. The spray roller system of claim 2, wherein the handle includes a door that covers the side opening when the door is in a closed position.

7. The spray roller system of claim 6, wherein the handle includes a latch for maintaining the door in the closed position when the handle is clamped onto the extension tube.

8. The spray roller system of claim 7, wherein the latch is pivotally connected to the shell and is pivotally connected to the door.

9. The spray roller system of claim 1, wherein the spray head includes a spray valve, a spray tip, and a spray guard.

10. The spray roller system of claim 9, wherein the spray valve is connected to the extension tube through a swivel coupling that allows orientation of the spray valve with respect to the paint roller to be adjusted.

11. The spray roller system of claim 9, wherein the spray valve is configured to automatically prevent dripping when the spray tip is lowered below horizontal.

12. The spray roller system of claim 9, wherein longitudinal position of the roller handle on the extension tube is adjustable to permit user adjustment of distance between the spray tip and the paint roller.

13. The spray roller system of claim 1, wherein the roller handle is mountable on the extension tube and removable from the extension tube without use of tools.

14. The spray roller system of claim 1, wherein the support structure is adjustable to receive and hold roller covers of different widths.

15. The spray roller system of claim 1, wherein the in-line valve includes an inlet for receiving paint under pressure, an outlet connected to the proximal end of the extension tube, a grip, and a trigger for opening and closing the in-line valve.

16. The spray roller system of claim 1, wherein the roller handle, when removed from the extension pole, is configured for use as a hand roller, and the extension pole, in-line valve and spray head are configured for use as a spray extension.

17. The spray roller system of claim 1, wherein the extension tube includes a plurality of extension tube sections joined together.

18. A spray roller system comprising:

an extension tube having a distal end and a proximal end;

a spray head mounted on the distal end of the extension tube, the spray head including a spray valve, a spray guard, and a spray tip;

an in-line valve mounted on the proximal end of the extension tube, the in-line valve including an inlet for receiving paint under pressure, an outlet connected to the proximal end of the extension tube, a grip, and a trigger for opening and closing the in-line valve; and a roller handle removably mounted on the extension tube adjacent the spray head, the roller handle including a handle configured to be clamped onto a portion of the extension tube located rearward of the distal end of the extension tube and the spray head, and a support structure extending from the handle beyond the spray head and the distal end of the extension tube to position a paint roller forward of the spray head.

19. The spray roller system of claim 18, wherein the handle includes a shell having a longitudinal interior channel with a side opening that allows the shell to slide laterally on to and off of the extension tube.

20. The spray roller system of claim 19, wherein the extension tube has exterior surfaces that mate with interior surfaces of the interior channel of the shell to prevent rotation of the handle when the handle is clamped on the extension tube, wherein the extension tube includes a plurality of exterior circumferential ribs, and wherein the interior channel of the shell has a feature that engages at least some of the exterior circumferential ribs of the extension tube to define a longitudinal location of the handle on the extension tube and to prevent longitudinal movement of the handle on the extension tube.

21. The spray roller system of claim 19, wherein the handle includes a door that covers the side opening when the door is in a closed position, and a latch for maintaining the door in the closed position when the handle is clamped onto the extension tube.

22. The spray roller system of claim 21, wherein the latch is pivotally connected to the shell and is pivotally connected to the door.

23. The spray roller system of claim 18, wherein the spray valve is connected to the extension tube through a swivel coupling that allows orientation of the spray valve with respect to the paint roller to be adjusted.

24. The spray roller system of claim 18, wherein longitudinal position of the roller handle on the extension tube is adjustable to permit user adjustment of distance between the spray tip and the paint roller.

25. The spray roller system of claim 18, wherein the roller handle is mountable on the extension tube and removable from the extension tube without use of tools.

26. The spray roller system of claim 18, wherein the support structure is adjustable to receive and hold roller covers of different widths.

27. A spray roller system comprising:

an extension tube having a distal end and a proximal end;

a spray head mounted on the distal end of the extension tube;

an in-line valve mounted on the proximal end of the extension tube; and a roller handle removably mounted on the extension tube adjacent to the spray head, the roller handle including a handle configured to clamp onto the extension tube and a support structure extending from the handle to position a paint roller forward of the spray head;

wherein the handle includes a shell having a longitudinal interior channel with a side opening that allows the shell to slide laterally on to and off of the extension tube; and wherein the extension tube includes a plurality of exterior circumferential ribs, and wherein the interior channel of the shell has a feature that engages at least some of the exterior circumferential ribs of the extension tube to define a longitudinal location of the handle on the extension tube and to prevent longitudinal movement of the handle on the extension tube.

28. A spray roller system comprising:

an extension tube having a distal end and a proximal end;

a spray head mounted on the distal end of the extension tube;

an in-line valve mounted on the proximal end of the extension tube; and a roller handle removably mounted on the extension tube adjacent to the spray head, the roller handle including a handle configured to clamp onto the extension tube and a support structure extending from the handle to position a paint roller forward of the spray head;

wherein the handle includes a shell having a longitudinal interior channel with a side opening that allows the shell to slide laterally on to and off of the extension tube; and wherein the handle includes a door that covers the side opening when the door is in a closed position.

29. The spray roller system of claim 28, wherein the handle includes a latch for maintaining the door in the closed position when the handle is clamped onto the extension tube.

30. The spray roller system of claim 29, wherein the latch is pivotally connected to the shell and is pivotally connected to the door.

* * * * *